United States Patent [19]

Nishida et al.

[11] Patent Number: 5,715,304
[45] Date of Patent: Feb. 3, 1998

[54] PRIVATE BRANCH EXCHANGE

[75] Inventors: Toshio Nishida; Shogo Ayame; Hiroaki Nagashima, all of Tokyo, Japan

[73] Assignee: Kabushiki Kaisha Toshiba, Kawasaki, Japan

[21] Appl. No.: 709,110

[22] Filed: Sep. 6, 1996

Related U.S. Application Data

[63] Continuation of Ser. No. 166,943, Dec. 15, 1993.

[30] Foreign Application Priority Data

Dec. 17, 1992 [JP] Japan ..................... 4-337450
Feb. 22, 1993 [JP] Japan ..................... 5-031881

[51] Int. Cl.⁶ ........................ H04M 15/00; H04M 1/00
[52] U.S. Cl. .................. 379/114; 379/121; 379/125; 379/134; 379/157
[58] Field of Search ............... 379/111–119, 120, 379/121, 125, 130, 131, 133, 134, 135, 136, 137, 140, 141, 156, 157

[56] References Cited

U.S. PATENT DOCUMENTS

| | | | |
|---|---|---|---|
| 4,270,024 | 5/1981 | Theis et al. | 379/113 |
| 4,410,765 | 10/1983 | Hestad et al. | 379/112 |
| 4,594,477 | 6/1986 | Noirot et al. | 375/225 X |
| 4,751,728 | 6/1988 | Treat | 379/113 |
| 4,813,065 | 3/1989 | Segala | 379/130 |
| 5,031,211 | 7/1991 | Nagai et al. | 379/225 X |
| 5,335,268 | 8/1994 | Kelly, Jr. et al. | 375/112 |
| 5,400,395 | 3/1995 | Berenato | 379/120 |

*Primary Examiner*—Curtis Kuntz
*Assistant Examiner*—Paul Loomis
*Attorney, Agent, or Firm*—Finnegan, Henderson, Farabow, Garrett & Dunner, L.L.P.

[57] ABSTRACT

In a private branch exchange having an optimum route selecting function of selecting an optimum route by taking the destination, day of the week, time zone, permissive class of the extension terminal and the like into consideration when a call originating request from the extension terminal is generated, adequately processing dial number and outputting the same to an outgoing line so as to use the route, the route is selected by taking usage rates of the respective routes into consideration. Further, in the route selecting process, the route is selected by taking communication time (estimated value) into consideration. In an exchange system which is constructed by connecting plural private branch exchanges and in which, when an optimum route connected to one exchange is busy, dial number for permitting use of the optimum route is output via another exchange, the optimum route is not immediately selected via another exchange, but a substantially optimum route or routes which are substantially the same as the optimum route and connected to the given exchange are selected so that the dial number will be output from the given exchange with maximum possibility.

29 Claims, 12 Drawing Sheets

| AREA #1 | | | |
|---|---|---|---|
| DAY | TIME ZONE | ROUTE | CLASS |
| SUNDAY & HOLIDAY | 0:00 ∫ 8:00 | TGN 1 TGN 2 TGN 4 TGN 5 | 7 |
| | | TGN 1 TGN 2 TGN 3 TGN 4 TGN 5 | 15 |
| | 8:00 ∫ 17:00 | TGN 1 TGN 4 | 5 |
| | | TGN 2 TGN 3 TGN 5 | 10 |
| | | TGN 1 TGN 2 TGN 3 TGN 5 | 12 |
| | | TGN 1 TGN 2 TGN 3 TGN 4 TGN 5 | 14 |
| ⋮ | | | |
| MONDAY | 0:00 ∫ 6:00 | TGN 1 TGN 2 TGN 4 | 13 |

F I G. 4

| ROUTE | NUMBER OF COMMUNICATIONS | | | TOTAL COMMUNICATION TIME | | |
|---|---|---|---|---|---|---|
| | COUNTED VALUE | RATE (%) | SET RATE(%) | TIME (MIN.) | RATE (%) | SET RATE(%) |
| TGN1 | 315 | 23 | 10 | 1,048 | 12 | 10 |
| TGN2 | 621 | 45 | 30 | 845 | 9 | 5 |
| TGN3 | 22 | 3 | 5 | 4,003 | 30 | 20 |
| ⋮ | | | | | | |
| TGN | 413 | 30 | 20 | 1,821 | 14 | 10 |

F I G. 5

| EXTENSION NUMBER | ESTIMATED COMMUNICATION TIME (MIN.) | | | |
|---|---|---|---|---|
| | AREA #1 | AREA #2 | ・・・ | AREA #M |
| 100 | 9 | 11 | | 4 |
| 101 | 12 | 7 | | 6 |
| | | | | |

F I G. 7

| AREA #1 | | | | |
|---|---|---|---|---|
| DAY | TIME ZONE | COMMUNICATION TIME (MIN.) | ROUTE | CLASS |
| SUNDAY & HOLIDAY | 0:00 ~ 8:00 | 0 ~ 3 | TGN 1 | 7 |
| | | | TGN 3 | 12 |
| | | | TGN 2 | 15 |
| | | 3 ~ 10 | TGN 1 | 7 |
| | | | TGN 2 | 15 |
| | | 10 ~ | TGN 1 | 7 |
| | | | TGN 4 | 10 |
| | | | TGN 2 | 11 |
| | 2:00 ~ 17:00 | 0 ~ 5 | | |
| | | 5 ~ | | |
| | 17:00 ~ 0:00 | | | |
| MONDAY | | | | |

F I G. 8

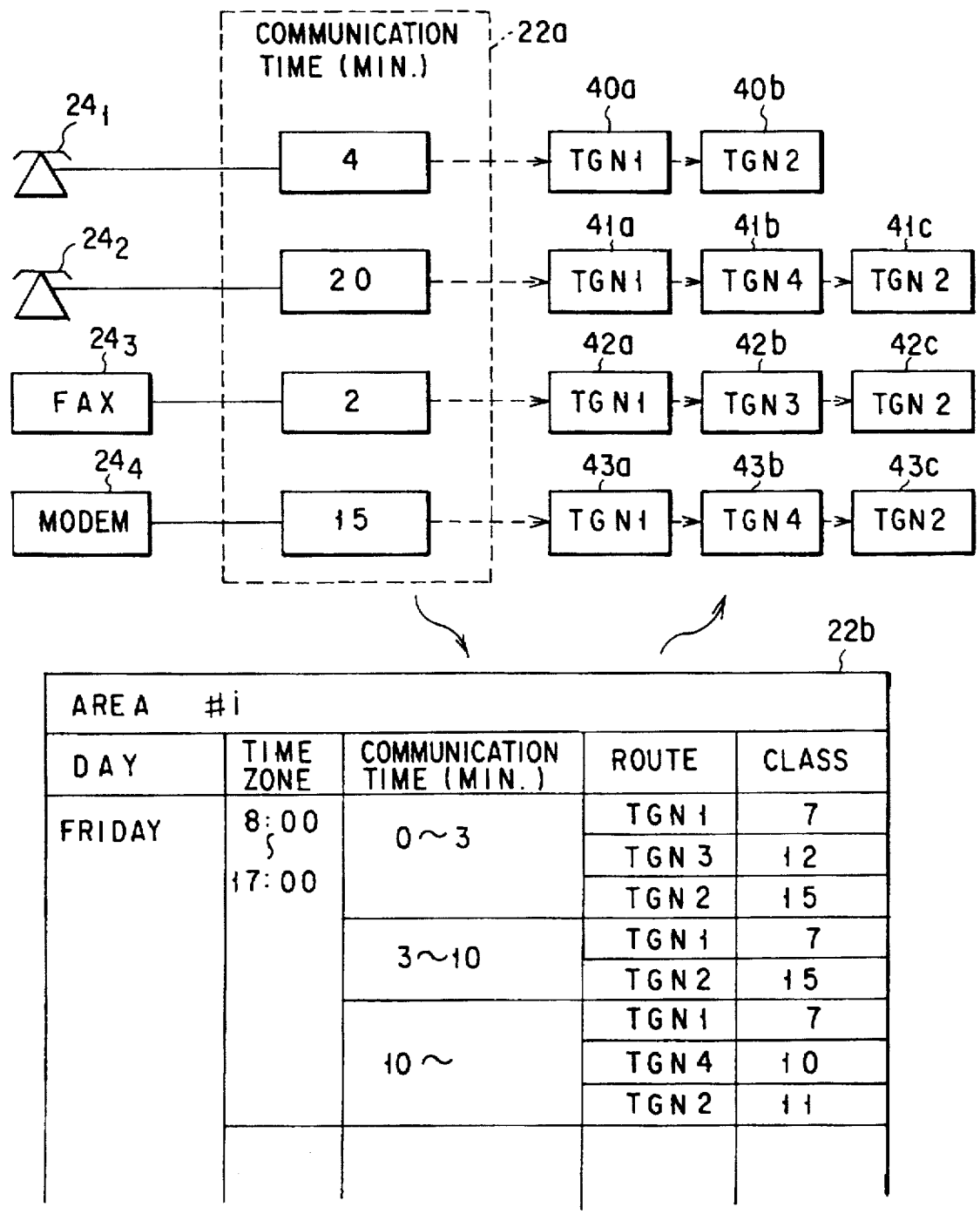
F I G. 10

| ROUTE | TGN 1 | | |
|---|---|---|---|
| CO LINE GROUP NUMBER | DIAL NUMBER TO BE ADDED | NUMBER OF DIGIT TO BE DELETED | FLAG |
| 1 | 0 0 A B | 0 | ON |
| 2 | 0 0 A B | 0 | ON |
| | | | |

FIG. 12

| CO LINE GROUP NUMBER | NODE 1 | NODE 2 | NODE 3 |
|---|---|---|---|
| 1 | BUSY | AVAILABLE | AVAILABLE |
| 2 | AVAILABLE | AVAILABLE | AVAILABLE |

FIG. 13

PRIVATE BRANCH EXCHANGE

This is a continuation of application Ser. No. 08/166,943, filed Dec. 15, 1993.

BACKGROUND OF THE INVENTION

1. Field of the Invention

The present invention relates to a private branch exchange capable of selecting an optimum route when a call is originated from an extension terminal to an outgoing line or office line.

2. Description of the Related Art

Recently, the exchange uses a microprocessor as a main unit for control and is made to have higher intelligence and highly sophisticated services. A digital electronic exchange (which is hereinafter simply referred to as a private branch exchange: which is briefly referred to as PBX) for private branch exchange accommodates extension lines and outgoing lines and make it possible to attain various services in addition to a basic function of switching between the extension lines and between the extension lines and the outgoing lines.

Among them, there is a connection restriction which is called a destination restriction provided for different types of calls. The destination restriction is a connection restriction for long-distance call areas or toll call areas and necessitates limitations on the private usage since various limitations are put on the connection to a trunk which is connected to a chargeable public communication network, private network, digital network, packet exchange network or the like from the viewpoint of law or individual systems unlike the no-charge extension connection or a specified measure for management must be taken to prevent the chargeable service such as a toll call or international call from being freely used via the extension line, and in general, the possibility of connection between a call originating terminal and an output trunk is determined to control the connection therebetween based on the class of service of the call originating terminal and connection restriction class thereof, the attribute of the output trunk and connection restriction class thereof, and dial information.

Further, the services such as busy call transfer or absent transfer, refusal of the incoming call in addition to the destination restriction can be set for respective extension lines and various service functions can be utilized in a predetermined range.

The types of calls under the destination restriction and the range in which the service can be utilized are divided into corresponding classes, the classes are registered into the respective extension lines, and the service in the permissive range is controlled in the exchange based on the registered class of the extension line so that the service in the predetermined range can be utilized.

Further, in recent years, for example, various types of corporations called new common carriers (which are hereinafter referred to as NCC) which provide services of circuits exclusively used for toll call networks are newly provided for the public communication network in addition to the NTT (Nippon Telegraph & Telephone Corporation) which is already provided. Further, a plurality of service corporations which similarly provide circuits for international calls are provided. The corporations provide services to users with different toll systems.

Among the private branch exchanges which are provided to receive the circuit services from the various corporations, there is provided a private branch exchange having a function (least cost routing function: which is hereinafter referred to as LCR function) of automatically selecting an optimum route or NCC according to the call destination, date and time (holiday or not, day time or night time), the class of the call originating extension terminal and the like so as to reduce the cost for communication.

The above function is a function called an optimum route selection of seizing a central office line (CO line) trunk connected to a circuit which satisfies the above condition when a call is originated from the extension line, and adequately converting the dial number from the extension line and outputting the converted dial number to the network side so as to select a route and originates the call. In this case, the word "optimum" in the term "optimum route selection" indicates "least cost", and therefore, the optimum route selection is often called the least cost routing (LCR) function.

In the PBX having the LCR function, a route selection table having routes registered therein and arranged in the order of cost is previously created by taking services for the above respective conditions into consideration, and then, a route is read out from the table and thus selected. In this case, the table is formed such that only the least cost route can be used if the class of the call originating terminal is low and not only the least cost route but also some other routes can be used when the class becomes higher so as to avoid the inconvenience in communication. That is, if the class is high and when the least cost route is busy, a next least cost route is sequentially selected.

In the above-described conventional PBX, even if a plurality of routes are at exactly the same cost under a certain condition, the routes are numbered in an order from the least cost for the sake of convenience and described in this order in the table, and read out in this order. That is, telephone calls tend to be concentrated on the route which is described in the table as the least cost route. Therefore, it is extremely difficult to manage selection of the route in a flexible manner according to the requirement of the users that a plurality of routes can be uniformly used when the routes are at the same cost or some low cost routes which are different from the least cost route but whose costs are not so different from the cost of the least cost route can be used at an adequate rate in addition to the least cost route if the cost difference therebetween is small, for example. Further, since telephone calls are concentrated on one route, there may occur a state in which the possibility that the call originating operation is successfully effected becomes low.

Further, the charges for telephone calls determined by the NTT or NCC may be different according to not only the destination of communication, the time and day of the week on which the call is made but also the communication time (time required for communication). However, in the conventional PBX, since it is not so constructed as to additionally take a factor of the communication time which is directly related to the charge into account when selecting the least cost route, the least cost route is not always selected for the actual period of communication time. The period of communication time is a factor which can be determined only at the time of completion of the communication and cannot be previously determined. Therefore, the conventional LCR function does not satisfactorily achieve the original function of reducing the communication cost.

Further, since the number of central office line trunks which can be accommodated in one PBX is limited, a system having a plurality of PBXs connected to one another via high-speed transmission lines such as optical fibers is developed in some business companies. In this system, plural types of central office lines are connected to the PBX, and the system is constructed such that if all of the central office lines of the type which is accommodated in an exchange to which a call originating terminal is to be connected and is desired to be used are busy at the time of call originating and when an central office line of the same type in another PBX is available, the available central office line can be used through the other PBX. At this time, the "type" indicates the specification and quality of the circuit such as a digital circuit, public communication network, packet exchange network, for example. Therefore, for example, when it is desired to make a call origination from the accommodated extension line of a PBX to the public communication network and if no central office line of the public communication network is available in the PBX but an central office line of the public communication network accommodated in another PBX is available, the available central office line is selected to make a call origination, or when it is desired to make a call origination from the accommodated extension line of a PBX to the digital network and if no central office line of the digital network is available in the PBX but an central office line of the digital network accommodated in another PBX is available, the available central office line is selected to make a call origination, and thus a network of the same type in another PBX is selected and used.

In the above selection method, since the prerequisite such as use of the same type of network is provided, use of the central office line of the same type in another PBX is immediately started when an central office line which is desired to be used is busy in the corresponding PBX, and therefore, the rate of communication between the PBXs becomes high, thereby causing the block rate between the PBX and the high-speed transmission lines to increase and increasing the possibility that the telephone call cannot be successfully made depending on the traffic amount and the accommodating condition of the telephones and central office lines.

To summarize, in the conventional PBX having LCR function, there is a possibility that telephone calls are concentrated on one of a plurality of routes even if the routes are set at the same cost, thus making it difficult to successfully make a telephone call. Further, even if the cost difference is small, telephone calls tend to be concentrated on the least cost route, also making it difficult to successfully make a telephone call.

Further, in the conventional PBX having LCR function, the class of the call originating extension line, the destination of communication, and the day of the week and time of the day at which the communication is made are referred to at the time of route selection, but since the communication time is not determined at the starting time of the communication and the factor of communication time is neglected even though the communication time is directly connected to the charge, a problem that the least cost route is not selected for some lengths of communication time occurs.

Further, in an exchange system which has a plurality of PBXs connected to one another and which can use a route selected via another PBX, the flexibility of use of central office lines in the PBXs can be enhanced, but since the communication rate between the PBXs increases, the block rate between the PBX and the high-speed transmission line increases, thereby making it difficult to make a telephone call including the inter-extension communication depending on the traffic amount and the accommodating condition of the telephones and central office lines and deteriorating the services for the users.

SUMMARY OF THE INVENTION

Accordingly, it is an object of the present invention to provide a PBX capable of effecting the flexible route selection which satisfies the requirement of the user.

A related object of the present invention is to provide a PBX having an LCR function which makes it possible to attain a sufficiently large communication cost reducing effect.

A further object of the present invention is to provide a PBX system which is one type of an exchange system which has a plurality of PBXs connected to one another and in which when an central office line of a desired type is busy in a specified PBX, an available central office line of a corresponding type in another PBX can be used; and which is so designed to suppress occurrence of a state in which the telephone call including the inter-extension communication is made difficult because the number of telephone calls to the central office line of another exchange becomes larger to increase the traffic amount between the PBXs, thereby making it possible to enhance the service for the user.

According to the present invention, there is provided a PBX connected to destinations of communication via a plurality of routes, comprises:

means for determining a rate of usage of the respective routes;

means for determining usable route or routes according to the destination of communication; and means for determining that one of the usable route or routes whose rate of usage is most different from a corresponding one of desired usage rates previously set for the respective routes.

According to the present invention, there is provided another PBX connected to destinations of communication via a plurality of routes, comprises:

means for determining average communication time for each of the extension lines and each of the destinations; and means, having cost indices for the respective routes corresponding to destinations and average communication times, for selecting an optimum route according to the destination and the average communication time of a call originating extension line.

According to the present invention, there is provided an exchange system constructed by connecting a plurality of private branch exchanges which each have a plurality of central office line groups having the same function and connected to destinations via a plurality of routes, comprises:

means for selecting an optimum route and a single central office line group which can use the optimum route at the time of call originating from an extension line which is connected to an given exchange;

means for determining whether said single central office line group is available or not;

means for effecting call origination via the optimum route by using another central office line group having the same function as said single central office line group when said single central office line group is busy; and means for effecting call origination via the optimum route by using a central office line group corresponding to said single central office line group and provided in another exchange when all office line groups having the same function as said single central office line groups are busy.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a diagram showing the route selection table made as shown in FIG. 3;

FIG. 5 is a diagram showing the number of communications and communication time table for respective routes referred to when a route is selected in the first embodiment;

FIG. 7 is a diagram showing a communication time table for respective extension lines used in a second embodiment;

FIG. 8 is a diagram showing a route selection table used in the second embodiment;

FIG. 10 is a diagram for illustrating the process of the LCR operation of the second embodiment;

FIG. 12 is a trunk route table used in the third embodiment;

FIG. 13 is a diagram showing a central office line trunk state table used in the third embodiment.

DETAILED DESCRIPTION OF THE PREFERRED EMBODIMENTS

A preferred embodiment of a PBX according to the present invention will now be described with reference to the accompanying drawings.

(First Embodiment)

Figure 1:
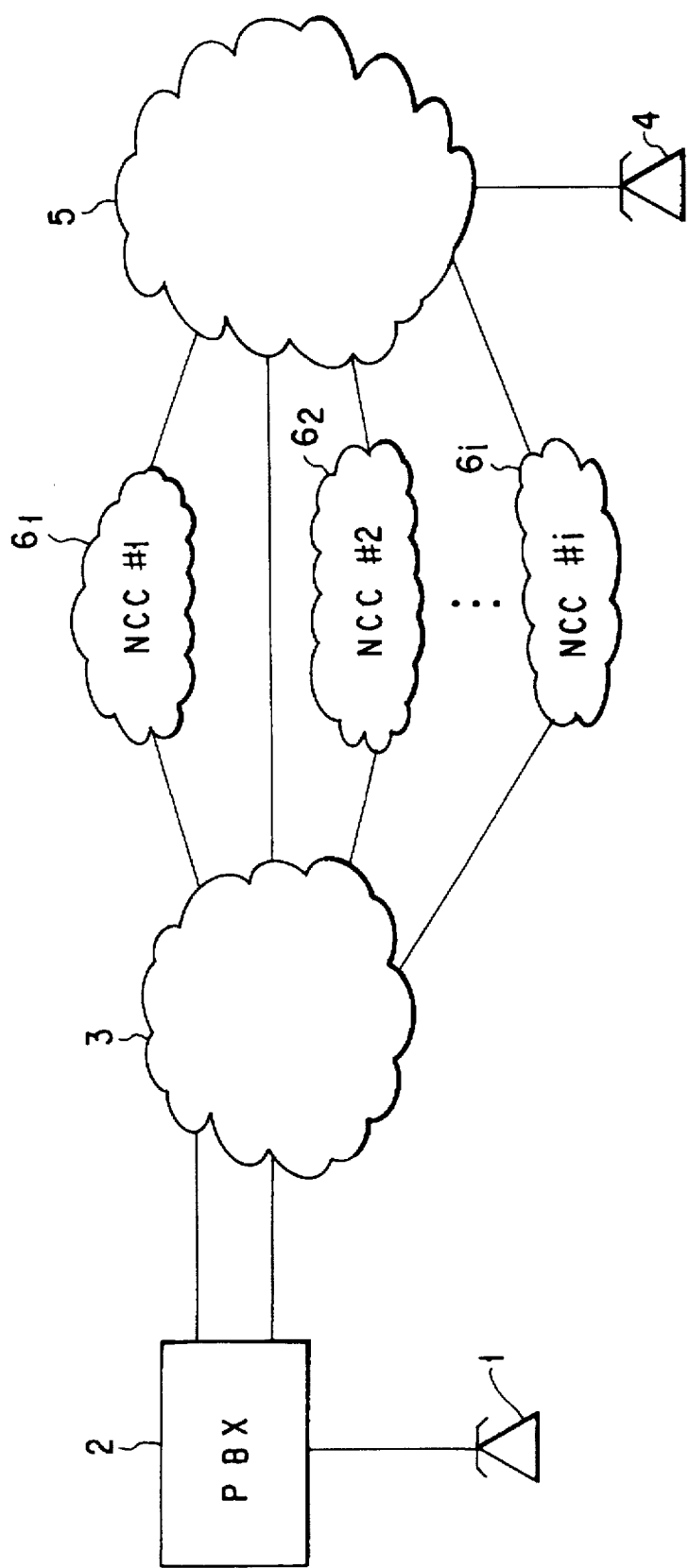
FIG. 1 is a diagram showing the entire network including a PBX according to the present invention.

As a first embodiment, a PBX capable of effecting flexible route selection according to the requirement of user is explained. FIG. 1 is a schematic diagram showing the entire network including such a PBX. When a call is originated from an extension telephone terminal 1 to a public communication network 3 via a PBX 2 and if a subscriber of the destination lies in the local call area, the call can be received or terminated by a subscriber 4 of the destination via only the public communication network 3. When a desired subscriber lies in a toll call area, the public communication network 3 in the local call area and a public communication network 5 of the destination in the toll call area may be connected to each other via a public communication network or a method of selecting one of NCC circuits $6_1$ to $6_i$ which has a node at a point near the public communication network 3, using the NCC circuit for connection over a long distance area and connecting the NCC circuit to a desired terminal 4 of the destination can be used. Although not shown in the drawing, the PBX may be connected to a digital network, packet network or the like in addition to the public communication network.

Selection of the route is effected by using the optimum route selecting function of the PBX 2. In order to utilize the function, a special number for starting the function is input by dialing from the extension terminal and then a telephone number of the destination is dialed. Then, in the PBX, in order to select the public communication network if the extension terminal is a telephone, a central office line trunk connected to the public communication network is seized, a trunk route which is a route to be used and previously set by taking the day of the week of the present day, the present time zone and the place of the called destination into consideration is selected based on the dial number from the extension terminal, and then a route is selected and transmitted by adequately converting dial number so as to permit the above route to be used and outputting the same to the network side. At this time, the word "optimum" in the term "optimum route selection" indicates "least cost", and therefore, the optimum route selection is often called the least cost routing (LCR).

Figure 2:
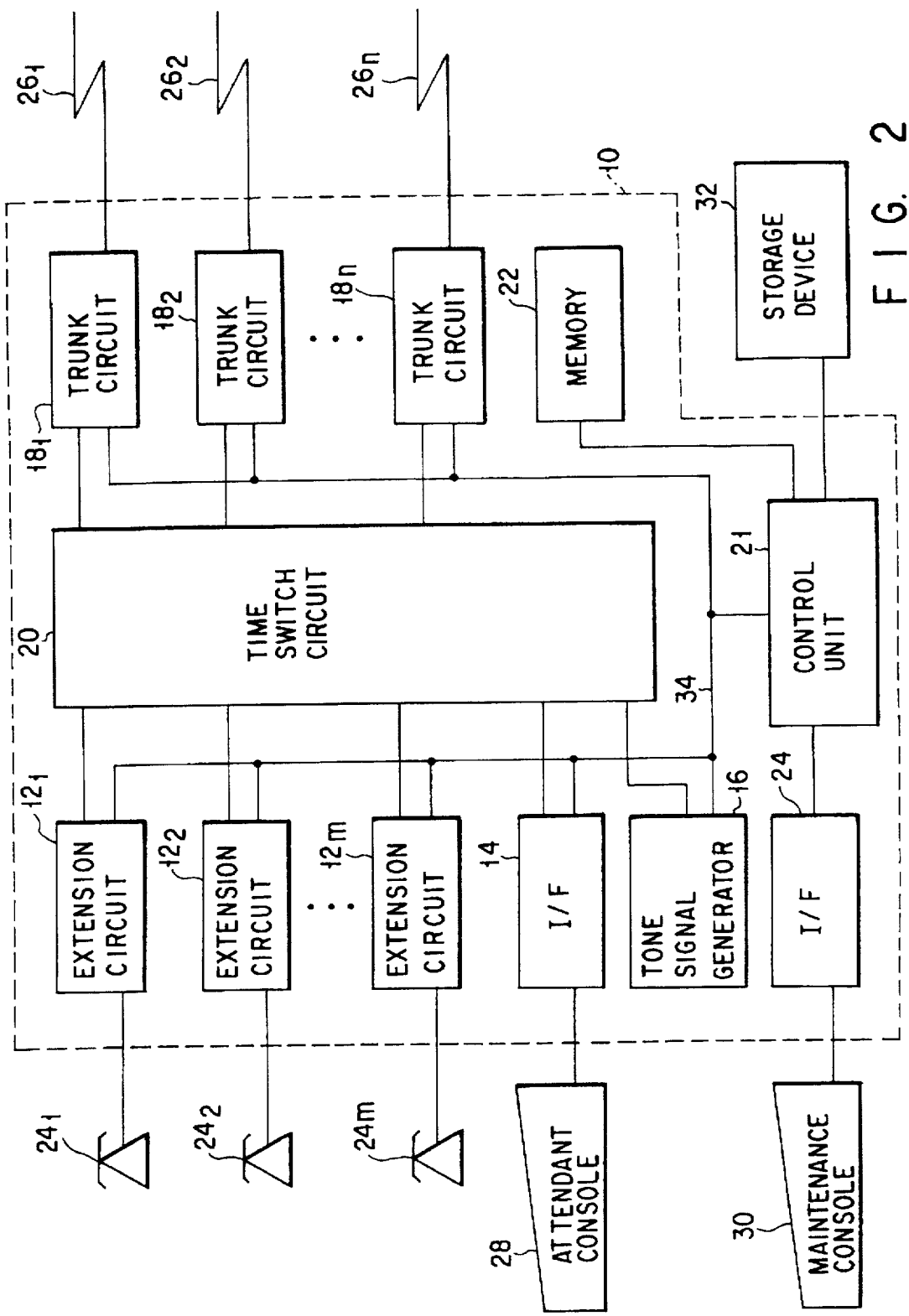
FIG. 2 is a block diagram showing a first embodiment of a PBX according to the present invention.

As the first embodiment, a PBX which has the LCR function and can effect the flexible route selection according to the requirement of the user instead of always selecting the least cost route is explained. FIG. 2 is a block diagram showing the first embodiment. An exchange main body 10 includes extension circuits $12_1$ to $12_m$, attendant interface 14, tone signal generator 16, trunk circuits $18_1$ to $18_n$, and time switch circuit 20 for switching the connection between the above units. Further, the exchange main body 10 includes a control unit 21 for controlling the entire portion, a memory 22, and a maintenance terminal interface 24. The extension circuits $12_1$ to $12_m$ are respectively connected to extension terminals $24_1$ to $24_m$. As the extension terminals $24_1$ to $24_m$, there are provided ordinary telephones, multi-function telephones, and facsimiles, for example. The tone signal generator 16 generates various types of tone signals. The trunk circuits $18_1$ to $18_n$ are respectively connected to outgoing lines $26_1$ to $26_n$. The interface 14 is connected to an attendant console 28. The interface 24 is connected to a maintenance console 30. The memory 22 is a ROM or RAM storing system data and extension line data in addition to control programs. Further, an external storage device 32 such as a hard disk device, or floppy disk device is also connected to the control unit 21. The outgoing lines $26_1$ to $26_n$ are not limited to the public communication network and may be a dedicated network or private network.

The time switch circuit 20 effects the switching between the extension lines, or from the extension line to the outgoing line (central office line or dedicated network) or from the outgoing line to the extension line. The control unit 21 executes the control for the circuit switching operation of the time switch circuit 20 and other various control operations for the entire portion.

The memory 22 stores various control programs, various tables and data such as the contents of set functions, and in addition, programs for causing the memory 22 to update and store various information items generated in the exchange, for example, information of the number of the call originating extension line and telephone communication time zone thereof, the number of communications, the number of originating calls to the outgoing line and telephone number of the destination, communication time zone, the charge for a telephone call (communication), and the present state and permitting data transfer between the memory 22 and the maintenance console 30 are stored in the memory 22.

The maintenance console 30 includes a keyboard and a display, and can effect the change and input of data and programs to the exchange main body 10 and the data readout therefrom. The interface 24 is an interface for connecting the exchange main body 10 to an external digital device and the maintenance console 30 is connected to the control unit 21 via the interface 24. The interface 24 is an interface capable of effecting the high-speed transmission of data and the like and the maintenance console 30 is connected to the control unit 21 of the exchange main body 10 via the interface 24 so as to communicate with the control unit 21.

The extension circuits $12_1$ to $12_m$ of the exchange main body 10 are connection interfaces provided for the respective extension terminals $24_1$ to $24_m$ and act as connection interfaces between the time switch circuit 20 and the respective extension terminals $24_1$ to $24_m$. The trunk circuits $18_1$ to $18_n$ act as interfaces between the time switch circuit 20 and the respective central office lines, dedicated networks (TIE lines) or private networks $26_1$ to $26_n$ and are circuits for effecting the D.C. loop close operation for seizing circuit and detecting an incoming call.

The time switch circuit 20 effects the control operation to create communication paths between the extension circuits $12_1$ to $12_m$ and the trunk circuits $18_1$ to $18_n$ so as to permit the ordinary exchange operation under the control of the control unit 21. In addition, the tone signal generator 16 is connected to the time switch circuit 20 so as to send various signal tones necessary for the telephone system.

Further, the interface 14 is used to connect the attendant console 28 and the exchange main body 10 to each other and is one type of a terminal control card, and has a function of transferring a speech, data and control signals with respect to the attendant console 28.

Signal transfer between the control unit 21 and the respective terminal control cards such as the interface 14, trunk circuits $18_1$ to $18_n$ and extension circuits $12_1$ to $12_m$ is effected via a control highway 34, but since the terminal control cards are allotted to input/output ports, each card has its own port number decoding means for specifying the terminal based on the port number which specifies the terminal, and when the port number coincides with its own port number, it determines that the access is made to itself.

The above-described constituents in the exchange main body 10 are connected to the control unit 21 via the control highway 34 and the control unit 21 effects the control operation to provide communication paths between the extension circuits $12_1$ to $12_m$ and the trunk circuits $18_1$ to $18_n$ according to the control program stored in the memory 22 so as to permit the ordinary exchange operation. Further, in order to realize the above control operations, data and programs for executing various control operations based on off-hook and on-hook signals and selection of a port number of the destination to be controlled for switching connection based on dial information are stored in the memory 22.

Further, the present system has a feature that it has a function of selecting the least cost route at the time of area connection (connection to the toll call area), and particularly, the function makes it possible to select a route based on the past records of usage of the respective routes.

Figure 3:
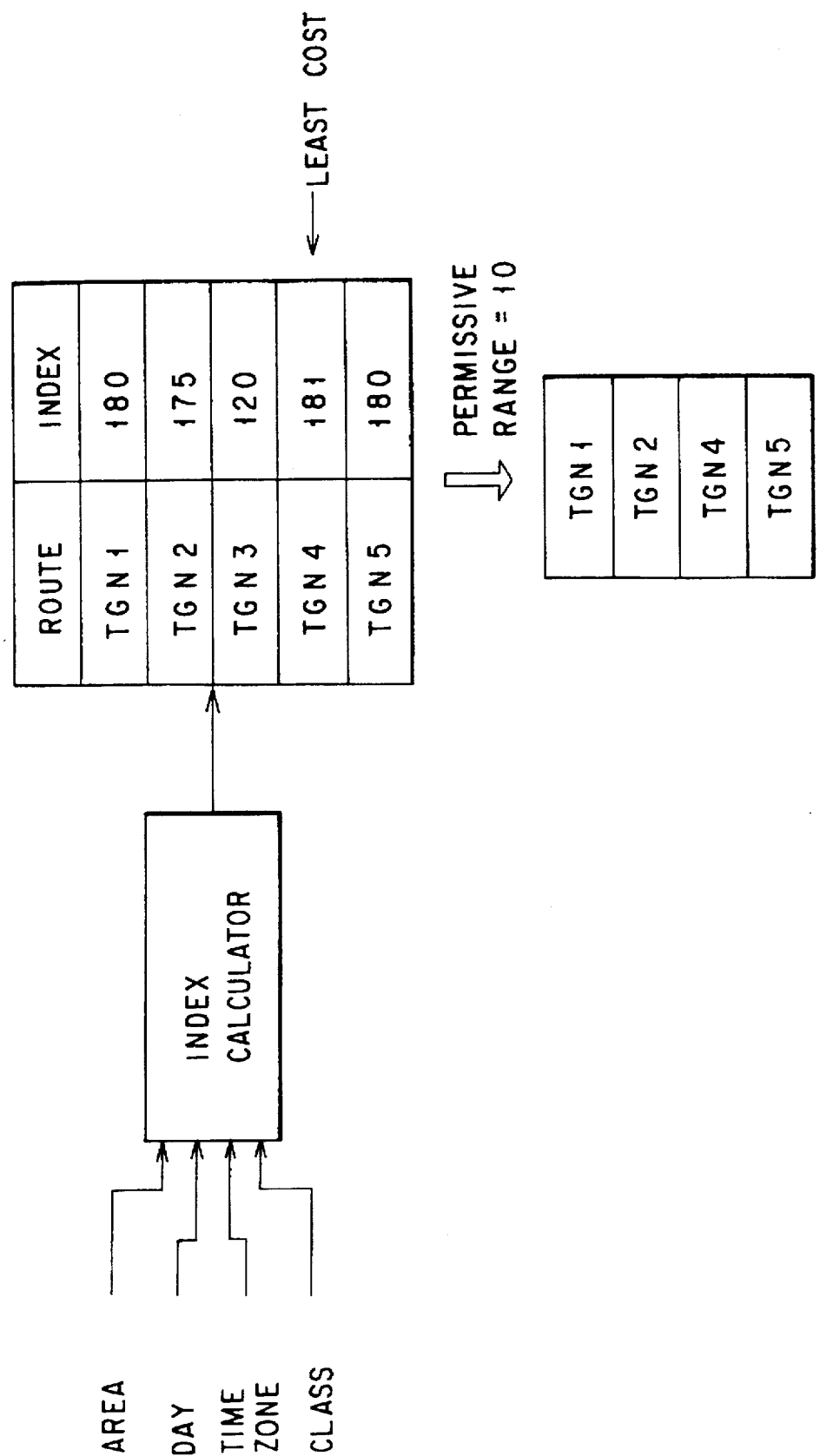
FIG. 3 is a diagram showing the process of making a route selection table.

FIG. 3 is a diagram showing the process of creating a table referred to at the time of route selection. Indices indicating the costs of routes for respective areas (destination), days of the week, time zones, permissive classes of the extension lines are determined. The index corresponds to the charge for a telephone call per unit time, for example. In this example, as the index value becomes larger, the optimum degree becomes higher, that is, the cost becomes lower, but the relation between the optimum degree and the index value may be inverted. In the example of FIG. 3, a route TGN4 is set at the least cost. With the conventional simple LCR function, only the route TGN4 is selected or originating calls are concentrated on the route TGN4 since the route TGN4 is first selected even if a plurality of routes have the same index. Therefore, in the present invention, routes having not only the index of least cost but also indices lying in the permissive range from the above index are listed as candidates in an indefinite order (not in an order of the cost). If the permissive value is set at 10, routes TGN1, TGN2, TGN4, and TGN5 are treated as candidates.

Thus, candidate routes are listed on a table for the respective areas (destinations), days of the week, time zones, permissive classes of the extension lines as shown in FIG. 4. The table is stored as a route selection table in the memory 22. For example, FIG. 4 indicates that it is possible to select four routes of the routes TGN1, TGN2, TGN4, TGN5 when making an originating call from the terminal of class 7 to the area #1 before 8 p.m. on Sunday, for example. In this case, the order of the routes TGN1, TGN2, TGN4, TGN5 is different from the order of the costs set from the lowest one. Therefore, in order to determine one of the four routes, it is necessary to refer to another condition. In this embodiment, the selection is made to make the rates of usage of the respective routes coincident with preset desired rates.

For this purpose, as shown in FIG. 5, a table of the rates of usage indicating the number of communications and total communication time of each route is formed and is stored in the memory 22 like the route selection table. Then, a route which is included in the candidate routes and has the largest difference between the rate of usage thereof and the desired rate is selected. In this example, the rate of usage is determined from the different viewpoints of the number of communications and total communication time, but in practice, it may be determined based on one of the factors specified by the user. Further, the rate of usage may be expressed by the total sum of the charges for telephone calls paid to the route (NCC). This is because it is sometimes desired to equally pay the charges for telephone calls to the respective NCCs.

Figure 6:
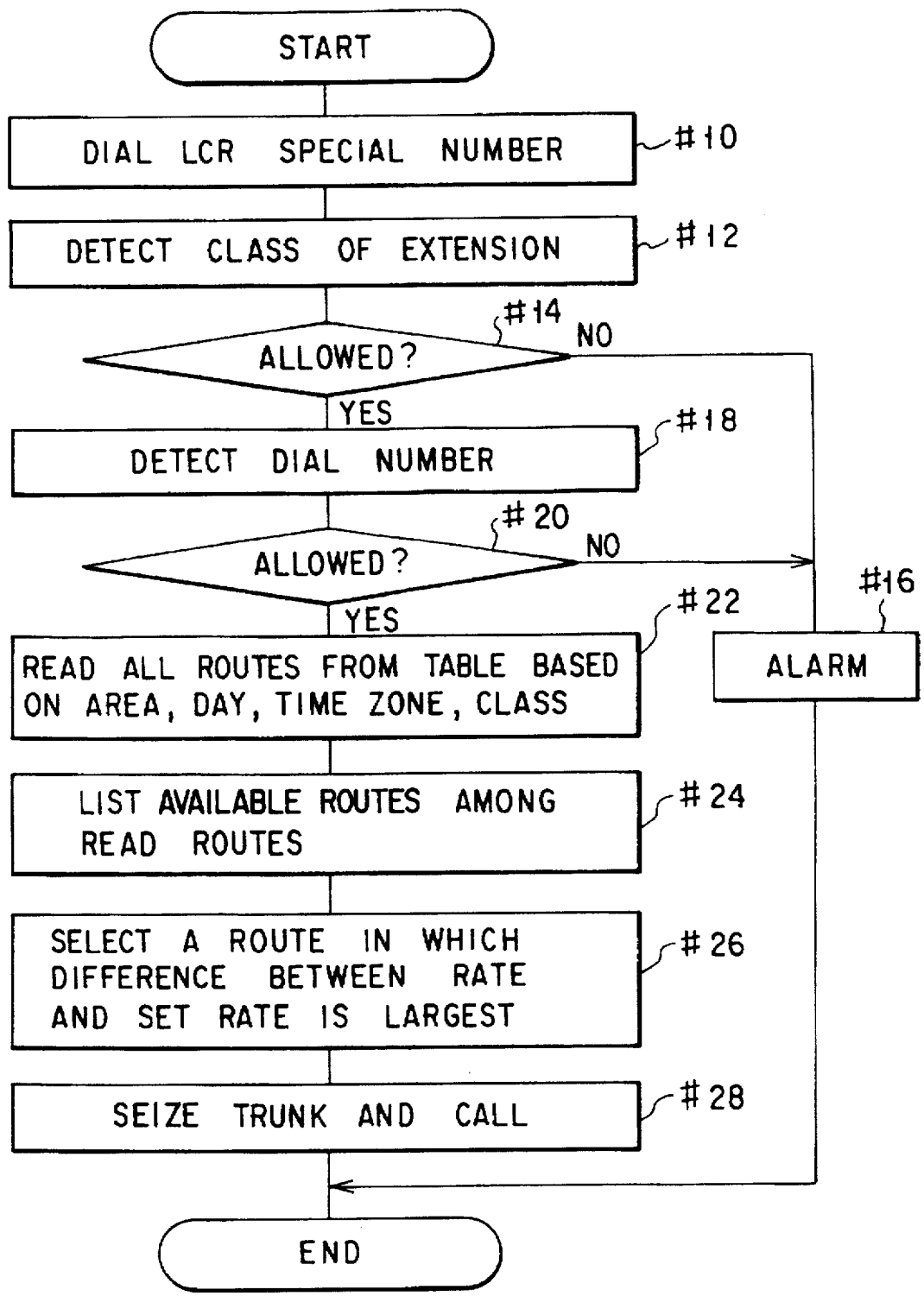
FIG. 6 is a flowchart for illustrating the route selection operation of the first embodiment.

FIG. 6 is a flowchart showing the above operations. In step #10, an extension terminal is operated to make an originating call and an LCR call originating special number is dialed from the extension line. The control unit 21 which has detected the number reads out information of call originating class for each extension line previously stored in the memory 22 in step #12. In step #14, whether the call originating for the corresponding extension line is permitted or not is checked. Then, if the checking result indicates that the extension line is an extension line in which the restriction of call originating is set, an alarm sound is generated in step #16 to inform the operator of the extension line that the originating call cannot be made from the extension line.

On the other hand, if the extension line is an extension line in which no restriction of call originating is set, dial information from the extension line is accumulated in step #18, and whether or not the extension line is an extension line in which the restriction on the area is set, that is, whether or not the extension line is an extension line in which the restriction of call originating to the outgoing line is set is checked in step #20. If the checking result indicates that the extension line is an extension line in which the destination restriction is set, an alarm sound is generated in step #16 to inform the operator of the extension line that the originating call cannot be made from the extension line.

If permission of the call originating to the destination is set, candidate routes for respective areas, days of the week, time zones, permission classes of the extension lines are read out from the route selection table of the memory 22 shown in FIG. 4 in step #22. In step #24, whether each of the routes is available or not is checked and available routes are extracted. In step #26, that one of the available candidate routes which has the largest difference between the rate of usage and the desired rate is selected based on the rate-of-usage table in the memory 22 shown in FIG. 5. In step #28, a central office line is seized and then dial information is transmitted.

As described above, according to the first embodiment, the rate of usage of each route can be set closer to the rate desired by the user, and thus, when selecting the optimum route, the route selection control which the user wants to use can be effected instead of using the conventional uniform route control system and a PBX capable of providing services of higher degree of freedom can be realized.

(Second Embodiment)

The second embodiment of the present invention is made such that predicted time required for communication in addition to the selection standard factors such as the class of a call originating subscriber, the destination of communication, time at which the communication is effected is taken into consideration to acquire the least cost central office line trunk and select a route when making an originating call from the extension line accommodated in a PBX having the LCR function to an outgoing line and therefore the communication can be more adequately effected in view of the communication cost.

In the second embodiment, in view of the fact that time required for communication (which is hereinafter referred to as communication time) is related to the charge for the telephone call and it varies depending on the circuit to be used, the communication time is taken into consideration when effecting the LCR, but since the length of the communication time itself is a particular factor which cannot be determined before the communication is completed and cannot be previously predicted, the communication time could not be used as one of the factors of the LCR in the prior art. However, in the second embodiment, the LCR function for satisfying the primary function of reducing the communication cost can be attained by estimating the communication time by subjecting the past communication times to the statistical process, previously deriving the communication time which is close to the actual communication time, and using the estimated communication time for the LCR.

Since the block diagram showing the construction of the second embodiment is the same as the block diagram showing the first embodiment shown in FIG. 2, the explanation therefor is omitted. However, the second embodiment is different from the first embodiment in that the control unit effects the statistical process for the estimated communication time and the thus derived communication time data is stored in the memory 22.

The second embodiment has a feature that a function of selecting the least cost route at the time of area connection (connection to the toll call area) is provided, and particularly, in this function, the communication time factor is taken into consideration to select a route.

In order to attain the above function, in the second embodiment, the average value of times required for communications for respective destinations or that one of the times required for the latest communications which appears most frequently is stored in the memory 22 and used as the estimated communication time.

The control unit 21 is designed to have the LCR processing function and the LCR processing function includes a selection process of selecting the least cost route which can be used at the time of seizing of central office line and route selection by using the estimated communication time together with factors known at this timing which are, for example, the class of the call originating extension line, destination of communication, time at which the communication is effected, and day of the week (a day such as a public or national holiday or the end or beginning of the year in which the charge is imposed as on a holiday is treated as Sunday. Therefore, information of week day/holiday may be used instead of information of the day of the week), circuit seizing in the selected route, and call originating control.

The least cost route selecting function is a function which is conventionally provided, but the function in the second embodiment is made different from the conventional function in that the communication time is additionally taken into consideration to select a route of the least communication cost.

Thus, in the second embodiment, a route selection table which is referred to in order to effect the LCR function is set to derive the optimum route by using the class of the call originating extension line, destination of communication, time at which the communication is effected, day of the week and estimated communication time as the selecting condition. Further, a table for estimated communication time information of each extension line for storing estimated communication times of each extension line for respective areas (destinations) is prepared so that the estimated communication time of the call originating extension line can be derived based on the above selecting condition.

These tables are stored in the memory 22. This makes it possible to provide the processing function of selecting a route of the least cost based on the route selection table by taking the estimated communication time together with the call originating class of the calling subscriber, destination of communication, type of communication, and time at which the communication is effected into consideration, seizing the thus selected central office line trunk of the least cost, and selecting a route as one of the control functions of the LCR.

The outline of the second embodiment is explained with reference to the block diagram shown in FIG. 2. If an incoming call is input from the outgoing line, the control unit 21 detects the incoming call via the trunk circuits $18_1$ to $18_n$ and effects the call incoming operation for an extension terminal (in the case of the attendant system or extension group system) which is set as a representative or effects the call incoming operation directly for a corresponding extension line (in the case of PBX dial-in system: a system of first receiving a subscriber's number from NTT and allotting the number to the extension line, and directly effecting the call incoming operation by dialing the subscriber's number). Then, a communication path is obtained according to a response of the extension terminal, thereby making it possible to effect communication between them. In order to transfer the incoming call to another extension line, the transfer operation is effected at the called terminal.

Then, the control unit 21 checks the restriction on the extension line of transfer destination and calls the extension line if a connection is permitted. When the destination subscriber responds, the control unit 21 makes a communication path between the destination extension line and the calling side outgoing line by cutting off the extension terminal at which the transfer operation is effected, thereby making it possible to effect the communication between them.

In response to an originating call from the extension line to the attendant, the control unit 21 effects the control to effect the call incoming operation for the attendant console 28 which is the terminal on the attendant side, and if the attendant console 28 responds, the control unit 21 makes a communication path between the call originating side and the call incoming side, thereby making it possible to effect the communication between them.

The inter-extension communication may be made when the extension line receives an extension number from a call originating extension line, and in this case, the connection restriction for a portion between the extension lines is first checked, and if a connection is permitted, the call incoming control is effected for a line circuit of a corresponding extension number, and a communication path is obtained when the connection terminal of the line circuit makes a response, thereby making it possible to effect the communication between the extension lines.

When an originating call from the extension line to the outgoing line is an originating call which is not caused by an LCR special number, the control unit 21 detects an available trunk circuit among the trunk circuits $18_1$ to $18_n$ in response to the call originating operation of the extension terminal, and after checking the connection restriction with respect to the call originating extension line, a communication path is obtained by use of the available trunk circuit if a connection is permitted, and then dial information is output to the office exchange. Then, when it is connected to the destination subscriber via the office exchange, the communication can be effected.

Various control operations including the call originating and incoming control of the trunk circuit and line circuit are effected by use of a port number, and if an extension number A is allotted to a port number $PN_n$, for example, the port number $PN_n$ is accessed when calling the extension number A. Such control is attained by causing the control unit 21 to effect the control based on terminal number information stored in the memory 22.

The present system has a feature that there is provided a service function in which when an originating call is made by dialing the least cost route special number in order to utilize the least cost routing function, a circuit connection is made by use of the least cost route which can be used by the system at this time and the communication can be economically effected. The control is explained in detail below.

FIG. 7 shows a communication time table for respective extension lines/destination areas which is a table for storing estimated communication times for respective areas for each of the extension telephones prepared in the memory 22 to realize the LCR function according to the present invention. The communication time table indicating estimated communication times for respective extension lines/areas stores average communication times for respective areas for each of the extension numbers and is used such that if the extension number is known, communication time information in the extension line of the extension number can be derived by reading out stored data corresponding to the extension number. The communication time table for respective extension lines/areas is set by a command from the maintenance console 30 under the control of the control unit 21. Alternatively, in a case where a communication time statistical program is provided in the exchange 10 so as to permit the control unit 21 to effect the statistical process, the control unit 21 calculates the average communication time based on the record of communications in a preset period of time and the result of calculation is stored into the memory 22. In this case, the average communication time for all of the communications effected up to now in the extension line can be used instead of the average communication time in a preset period of time, or communication time which has most frequently occurred may be selected from the frequency distribution of times required for communication and used, and thus, it should be adequately set to most effectively use the feature of the present invention.

FIG. 8 shows an example of a route selection table prepared in the memory 22 for effecting the LCR according to the present invention. As shown in FIG. 8, the route selection table is provided for each of the areas (for each toll call area), information items (information of the table having trunk route information described therein) each indicating a trunk route (a central office line trunk to be used and a circuit route such as an NTT circuit or NCC circuit to be used) to be used according to the day of the week, time zone and communication time and permissible classes are set therein, and when the day of the week, time zone, communication time and permissible class are given, trunk routes satisfying the above condition are sequentially read out as the least cost route.

Figure 9:
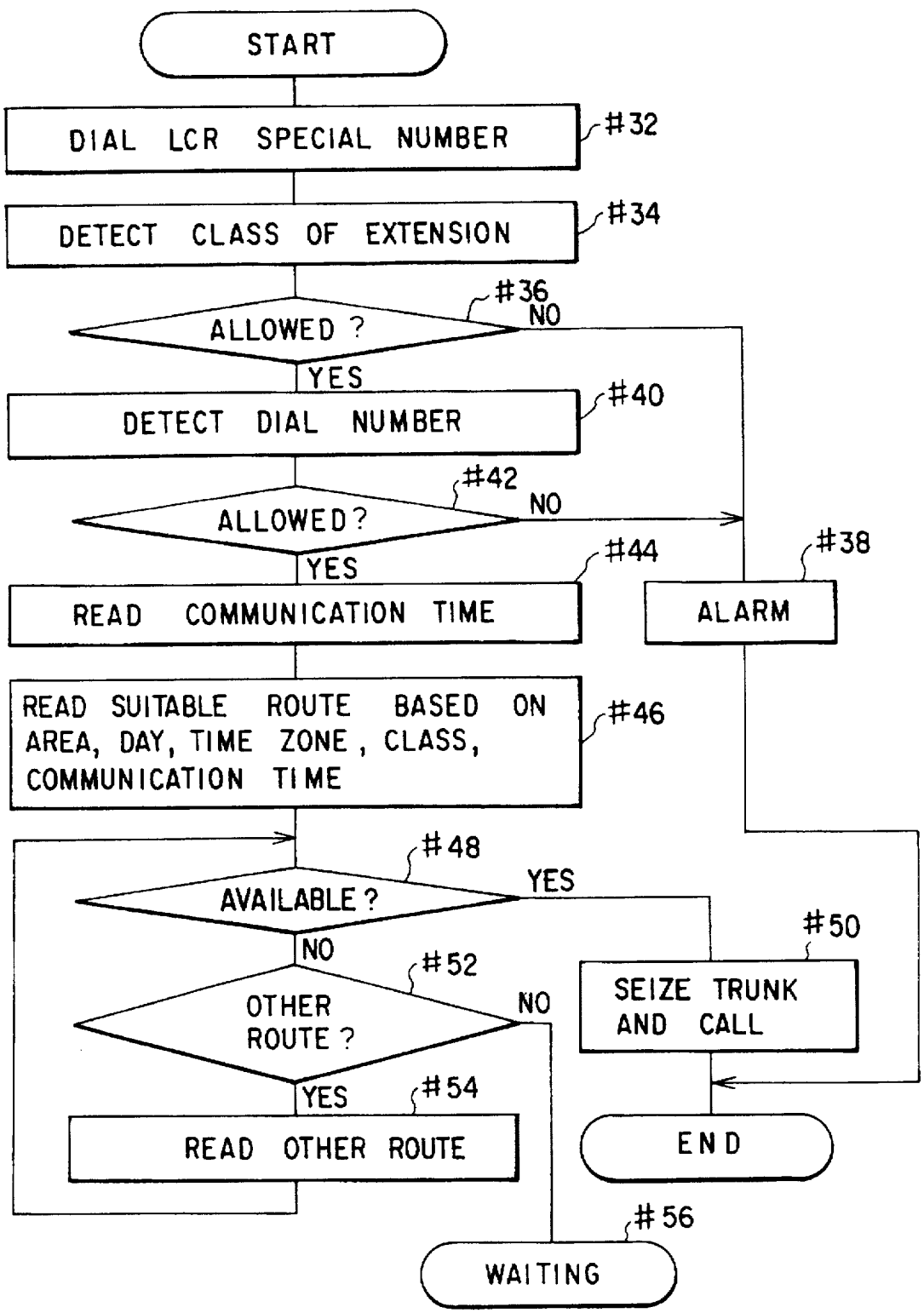
FIG. 9 is a flowchart for illustrating the route selection operation of the second embodiment.

Next, the process of effecting the call originating operation via the outgoing line by using the LCR function according to this embodiment is explained with reference to the flowchart shown in FIG. 9.

In step #32, the call originating operation is effected at an extension terminal and an LCR calling special number is dialed via the extension line. The control unit 21 which has detected the originating call reads out information of call originating classes for respective extension lines previously stored in the memory 22 in step #34. Then, in step #36, whether the call originating is permitted or not is checked for the extension line. If, as a result, it is detected that the call originating restriction is imposed on the extension line, an alarm sound is generated in step #38 to inform the operator of the extension line that the originating call cannot be made from the extension line.

On the other hand, if no call originating restriction is imposed on the extension line, dial information from the extension line is accumulated in step #40, and whether the destination restriction is set or not, that is, whether the call originating restriction for the outgoing line is set in the extension line is checked in step #42. If, as a result, it is detected that the destination restriction is set in the extension line, an alarm sound is generated in step #38 to inform the operator of the extension line that the originating call cannot be made from the extension line to the outgoing line.

Further, if the call originating for the area is permitted, estimated communication time for an area dialed from the extension line is read out from the communication time table indicating communication times for respective extension lines/areas in the memory 22 in step #44. In step #46, the optimum route corresponding to the area, day of the week, time zone, communication time, permissive class of the extension line is read out from the route selection table in the memory 22 shown in FIG. 8. In step #48, whether the corresponding route is available or not is checked. If it is available, a central office line is seized and then dial information is generated. If it is busy, whether or not another route is present in the route selection table is checked in step #52, and if another (the second best) route is present, the route is read out in step #54 and then the process is returned to step #48. If there is no available route among all of the routes which are listed in the table, a service such as an available route waiting process is effected in step #56.

As described above, according to the second embodiment, a route which is available at present and has the lowest cost is selected, a central office line trunk adequately used for the route is seized, and after a necessary dial converting process is effected for dial number from the call originating extension line, the dial number is transmitted and communication can be effected by using the route which can be used at the lowest communication cost.

The route which can be used is sometimes limited by the class of the extension line, but when none of the routes which are permitted for the call originating extension line are available, a busy tone may be generated or another service such as an available route waiting process may be effected.

FIG. 10 shows a method for effecting the LCR according to the second embodiment. In FIG. 10, $24_1$ to $24_4$ denote terminals accommodated as extension terminals in the exchange, among them, $21_1$ and $21_2$ denote analog telephones, $21_3$ denotes a facsimile terminal, and $21_4$ denotes an analog MODEM terminal for effecting data communication.

A communication time table 22a for respective extension lines/areas stores average communication time information for respective areas for each extension terminal and a route selection table 22b for an area "i" is constructed by items including the day of the week, time zone, communication time, route, and permissive class, and indicates that a route TGN1 is selected as the optimum route if the permissive class is in the range of 7 in a case where the communication time is within 3 minutes in the time zone from 8 to 17 o'clock on Friday, for example, and three routes TGN1, TGN3, TGN2 can be selected if the permissive class is in the range of 15 under the same condition. Further, it indicates that the route TGN1 is selected when the communication time is 3 to 10 minutes on the same day and in the same time zone and if the permissive class is in the range of 7, for example, and two routes TGN1 and TGN2 can be selected under the same condition if the permissive class is in the range of 15.

Assuming a case wherein the respective extension terminals $24_1$ to $24_4$ calls to the area "i" in the time zone from 8 to 17 o'clock, the route selection order derived by use of the communication time table 22a for extension lines and the route selection table 22b is set to an order from 40a to 43c.

That is, if a business telephone denoted by a reference numeral $24_1$ and having a permissive class of 15 is used, the communication time stored in the communication time table 22a for extension lines is 4 minutes, and therefore, the route TGN1 is selected as a first candidate 40a which is the best candidate from a corresponding item of the route selection table 22b and an outgoing line set in the item is used, but if it cannot be used, the TGN2 is selected as a second candidate 40b which is the second best candidate. Further, if the MODEM terminal $24_4$ having the permissive class of 11 is used, the communication time stored in the communication time table 22a for respective extension lines is 15 minutes, and therefore, the route TGN1 is selected as a first candidate 43a from a corresponding item of the route selection table 22b and the routes TGN4 and TGN2 are respectively selected as second and third candidates 43b and 43c, for example.

Thus, the candidates are sequentially selected from the least cost one and used, and the least cost route which can be used at the present time can be used.

The type of the central office line to be used and the content of dial number to be converted are stored in the route selection table, a central office line trunk of the type of the central office line set in the table is seized, and when a to-be-converted portion of dial number from the call originating extension line is converted according to the content of the dial number to be converted and transmitted to the central office line trunk, a circuit of the selected least cost route can be obtained and communication with the destination using the least cost route becomes possible.

As described above, the second embodiment is constructed such that, in a PBX having at least extension lines and central office lines accommodated therein and having the route selecting function capable of selecting the optimum available route based on at least the condition known at the time of route selection from the available routes provided by plural types of circuits adopting charging systems which are determined according to conditions such as destination of communication and time zone, day factors (holiday, week day, or day of the week; the holiday includes a day equivalently treated as a holiday), and estimated communication time when an originating call is made from an extension line to an outgoing line, a table for storing estimated communication time information items provided for respective areas based on the past communication record in the extension line is provided for the extension lines, and control means for using the communication time information of the call originating extension line obtained from the above table as one of the conditions when the optimum available route is selected and selecting the optimum route based on the above conditions and making an originating call is provided. Communication time information which is one of the important factors when determining whether the charge for a telephone call is high or low is derived based on the past record of usage of the extension line and stored into a table provided for the extension lines, and when an originating call is made from the extension line to the outgoing line, the route selection order is determined by referring to not only the area, time at which the communication is made, and day of the week (a day such as a public or national holiday or the end or beginning of the year in which the charge is imposed as on a holiday is treated as Sunday) but also the communication time so that the route can be more specifically set, thus making it possible to significantly reduce the communication cost.

In the second embodiment, the average communication time is stored in the memory as estimated communication time, but communication time corresponding to the largest number of communications derived from the past communication record may be used or other desired time can be set. Further, setting into the communication time table may be effected by use of a data setting command, or by providing a statistical program for communication time in the exchange and adequately updating the contents of the table or the like based on the result of automatic measurement. Further, the communication time table is made for respective extension lines/areas, but it may be made simply for respective extension lines or for respective areas. In addition, a factor of communication can be incorporated into the route selection table in the first embodiment. On the other hand, it is possible to select several candidate routes in the second embodiment in the same manner as in the first embodiment and select one route from the candidate routes based on the past communication record.

(Third Embodiment)

The above embodiments are explained by taking an example of the LCR for the accommodated central office lines in one PBX. Next, a third embodiment for enhancing the service in an exchange system which is constructed such that a plurality of PBXs are connected via communication paths, and when an available central office line is not present in one PBX, an available central office line in another PBX can be used.

The third embodiment is made to achieve such an object as to suppress occurrence of a state in which the telephone call including inter-extension communication is made difficult due to an increase in the traffic amount of the communication path connecting the PBXs for bypass routing, thereby enhancing the user service in an exchange system in which a plurality of PBXs are connected via the communication paths, and if an available central office line is not present in one PBX, an available central office line in another PBX can be used.

In this embodiment, a self node (a PBX in this system is defined as a node in the following description) priority flag is used at the time of route selection in the LCR, and when a central office line group which is equivalent in the charge for a telephone call and communication quality is provided in the self node, the above flag is set so that even if all of the central office lines in the central office line group (a central office line trunk necessary for using a route selected in the LCR) of the self node are busy and an available central office line is present in the priority central office line groups (a central office line trunk connected to the central office lines of the same type as the central office line trunk necessary for using a route selected in the LCR) of another node, the equivalent central office line group of the self node is used and the priority central office line group of the other node is not used as a bypass route.

Figure 11:
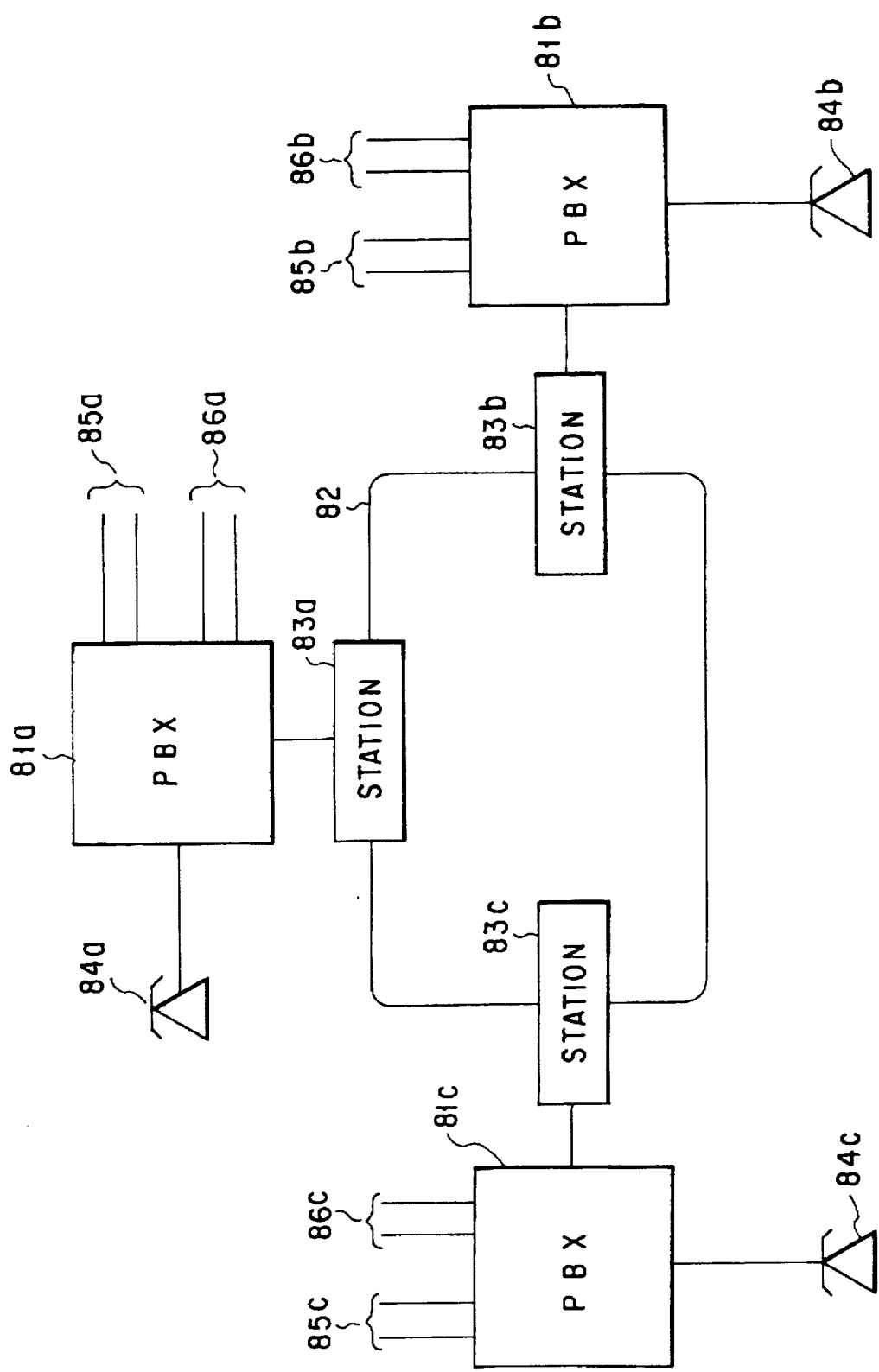
FIG. 11 is a diagram showing the entire construction for illustrating a third embodiment of the present invention.

FIG. 11 shows an arrangement of three PBXs connected together via an optical loop. PBXs 81a to 81c are connected together via an optical loop 82 to form a communication path between the PBXs. Stations 83a to 83c each having an optical repeater and an interface for connecting the PBX to the optical loop are connected between the optical loop 82 and the respective PBXs 81a to 81c. 84a to 84c denote extension telephones accommodated in the respective PBXs 81a to 81c, 85a to 85c denote first priority central office line groups (central office line number: 1) of this system, 86a to 86c denote second priority central office line groups (central office line number: 2) of this system, and in this embodiment, the first priority central office line groups 85a to 85c and the second priority central office line groups 86a to 86c have the functions equivalent in the charge for a telephone call, communication quality, and the like.

The first priority central office line groups 85a to 85c indicate a central office line trunk necessary for using a route selected by the LCR, and the second priority central office line groups 86a to 86c indicate a central office line trunk connected to a different type of network which satisfies the standard of communication and transmission quality substantially equivalent to those of the first priority central office line groups 85a to 85c.

In the PBXs 81a to 81c, when the LCR is used at the time of making of originating call from the extension line accommodated in the self node to an outgoing line and if a central office line trunk in the self node necessary for using the selected route is busy, a bypass route is prepared by using an available central office line trunk in another PBX. In order to obtain the availability information, in this system, the present information items of circuits accommodated in the self node are transferred to each other in each PBX by using the stations 83a to 83c and optical loop 82 and information items for the respective types of the present circuits are stored in the tables in the respective PBXs so as to be referred to when necessary.

When the central office line accommodated in the other node is used as a bypass route, an instruction of setting of the right of using a central office line of a desired type is sent from the self node to a PBX of the other node in which the right of using an available office trunk of the above type is set and a circuit is seized, then, a transmission path is made between the central office line trunk on which the right of using is set and the PBX of the requesting source via the station and optical loop, dial number is transmitted, and information transfer between the extension terminal of the requesting source and the central office line trunk on which the right of using is set is made possible.

The specification of each PBX is similar to that shown in the block diagram of the first embodiment shown in FIG. 2, but it is different from that of FIG. 2 in that the trunk circuit is connected to a plurality of priority central office line groups and a time switch circuit 20 is connected to the stations 83a to 83c via an interface (not shown). In this embodiment, in the PBXs 81a to 81c, if the LCR is used when an originating call is made from the extension line accommodated therein to the outgoing line, an available office trunk of another PBX is used to make a bypass route when anyone of the central office line trunk of the self node necessary for using the selected route is busy. In order to obtain the availability information, in this embodiment, the present information items of circuits accommodated in the self node are transferred to each other in each PBX by using the stations and the optical loop and information items for the respective types of the present circuits are stored in the tables in the respective PBXs so as to be referred to when necessary. When the central office line accommodated in the other node is used as a bypass route, an instruction of setting of the right of using a central office line of a desired type is sent from the self node to a PBX of the other node in which the right of using an available office trunk of the above type is set and a circuit is seized, then, a transmission path is made between the central office line trunk on which the right of using is set and the PBX of the requesting source via the station and optical loop, dial number is transmitted, and information transfer between the extension terminal of the requesting source and the central office line trunk on which the right of using is set is made possible.

The bypass method is not limited to the above-described method and the following method may be used. In the PBXs 81a to 81c, in a case where the LCR is used when an originating call is made from the extension line accommodated therein to the outgoing line and if anyone of the central office line trunk of the self node necessary for using the selected route is busy, an inquiry about whether an available central office line trunk accommodating a circuit of the same type as the type of the circuit to be used by the self node is present or not is made to another PBX via the station and the optical loop, and the PBX having an available central office line trunk returns a response indicating the presence of an available central office line to the inquiring source in response to the inquiry, the inquiring source which has received the response sends an instruction of setting of the right of using a trunk to the responding source, and in the responding source, the right of using an available office trunk of the above type in the inquiring source is set and a circuit is seized, then, a transmission path is made between the central office line trunk on which the right of using is set and the PBX of the inquiring source via the station and optical loop, dial number is transmitted, and information transfer between the extension terminal of the calling source and the central office line trunk on which the right of using is set is made possible.

The above function is attained by the control unit 21.

In the third embodiment, there is provided a feature that it has not only a function of effecting the above-described LCR when an originating call is made from the extension line to the outgoing line, and making an originating call by using the selected route, but also a function of effecting the control to use the equivalent central office line group of the self node and make no bypass route by use of the priority central office line group of another node when the central office line groups of the equivalent level in the charge for a telephone call, communication quality and the like are present in the central office lines accommodated in the self node and even if all of the priority central office line groups of the self node are busy and an available central office line is present in the priority office groups of another node.

In order to realize the above function, a self node priority flag is set for each bypass route in the route selection table used for the LCR, and the control unit 21 is constructed to have such a function that the flag is set to permit the equivalent central office line group in the self node to be used when all of the priority central office line groups of the self node are busy and make a bypass route by use of the priority central office line group of another node only when all of the equivalent central office line groups of the self node are busy.

In the system of the above construction, if an incoming call is made via an outgoing line, the control unit 21 detects the incoming call via the trunk circuits $18_1$ to $18_n$ and effects the call incoming operation for an extension terminal (in the case of the attendant system or extension group system) which is set as a representative or effects the call incoming operation directly for a corresponding extension line (in the case of PBX dial-in system: a system of first receiving a subscriber's number from NTT and allotting the number to the extension line, and directly effecting the call incoming operation by dialing the subscriber's number). Then, a communication path is obtained according to a response of the extension terminal, thereby making it possible to effect communication between them. In order to transfer the incoming call to another extension line, the transfer operation is effected at the call incoming terminal.

The inter-extension communication may be made when an extension line receives an extension number from a calling extension line, and in this case, the connection restriction between the extension lines is first checked, and if a connection is permitted, the call incoming control is effected for a line circuit of a corresponding extension number, and a communication path is obtained when the connection terminal of the line circuit makes a response, thereby making it possible to effect the communication between the extension lines.

In response to a call from the extension line to an extension line accommodated in another node, the control unit 21 sends a call to the other node (PBX) via the station 83 to effect the call incoming operation for an extension line which is the call incoming destination, and if the other PBX calls the extension line of the destination and the called extension line makes response, the control units 21 of the other PBX acquire communication paths on the call originating and call incoming sides, thereby making it possible to effect the communication between them via the station 83 and optical loop 82. Substantially the same operation is effected when an incoming call from the outgoing line is transferred to an extension line of another node.

When an originating call from the extension line to the outgoing line is a call which is not caused by an LCR special number, the control unit 21 detects an available trunk circuit among the trunk circuits $18_1$ to $18_n$ in response to the call originating operation of the extension terminal, and after checking the connection restriction for the call originating extension line, a communication path is obtained by use of the available trunk circuit if a connection is permitted, and then dial number is output to the office exchange. Then, if it is connected to the destination subscriber via the office exchange, the communication can be effected.

When an outgoing line accommodated in a self node can be used in a case where an originating call is made from an extension by dialing the least cost route special number in order to utilize the least cost routing function, the operation similar to the operation explained in the first or second embodiment is effected.

Next, the operation effected when no outgoing line is available in a route selected by the least cost routing function in the self node, that is, when a central office line trunk is busy in the selected route is explained.

A route selection table used in the third embodiment may be the table used in the second embodiment and shown in FIG. 8 or a table conventionally used. Further, it may be a combination of those used in the first and second embodiments. In the third embodiment, information read out from the route selection table is not used as it is, but a route is selected by additionally referring to a trunk route table as shown in FIG. 12. In the trunk route table, a central office line group to be used at the time of call originating, the contents of dial number to be modified are previously set, a circuit in the selected least cost route can be obtained by effecting the control to acquire a central office line trunk of a central office line group in the table, changing a to-be-converted digit of the dial number from the call originating extension line according to the contents of to-be-converted dial number and sending the same to the central office line trunk. Information of a central office line group indicating the best central office line and information of second best central office line groups similar to the best central office line in the communication quality and standard are sequentially registered in this order in the trunk route table and whether or not use of the second best central office line group is permitted can be determined by use of flags.

FIG. 13 shows an accommodated central office line trunk state information storing table which stores available/busy information of the central office line groups and the table is controlled and updated by the control unit 21 so as to display "available" when at least one of the central office lines of the central office line group of the self node is available, and the table is provided in each memory 22 in the self node (PBX).

Figure 14:
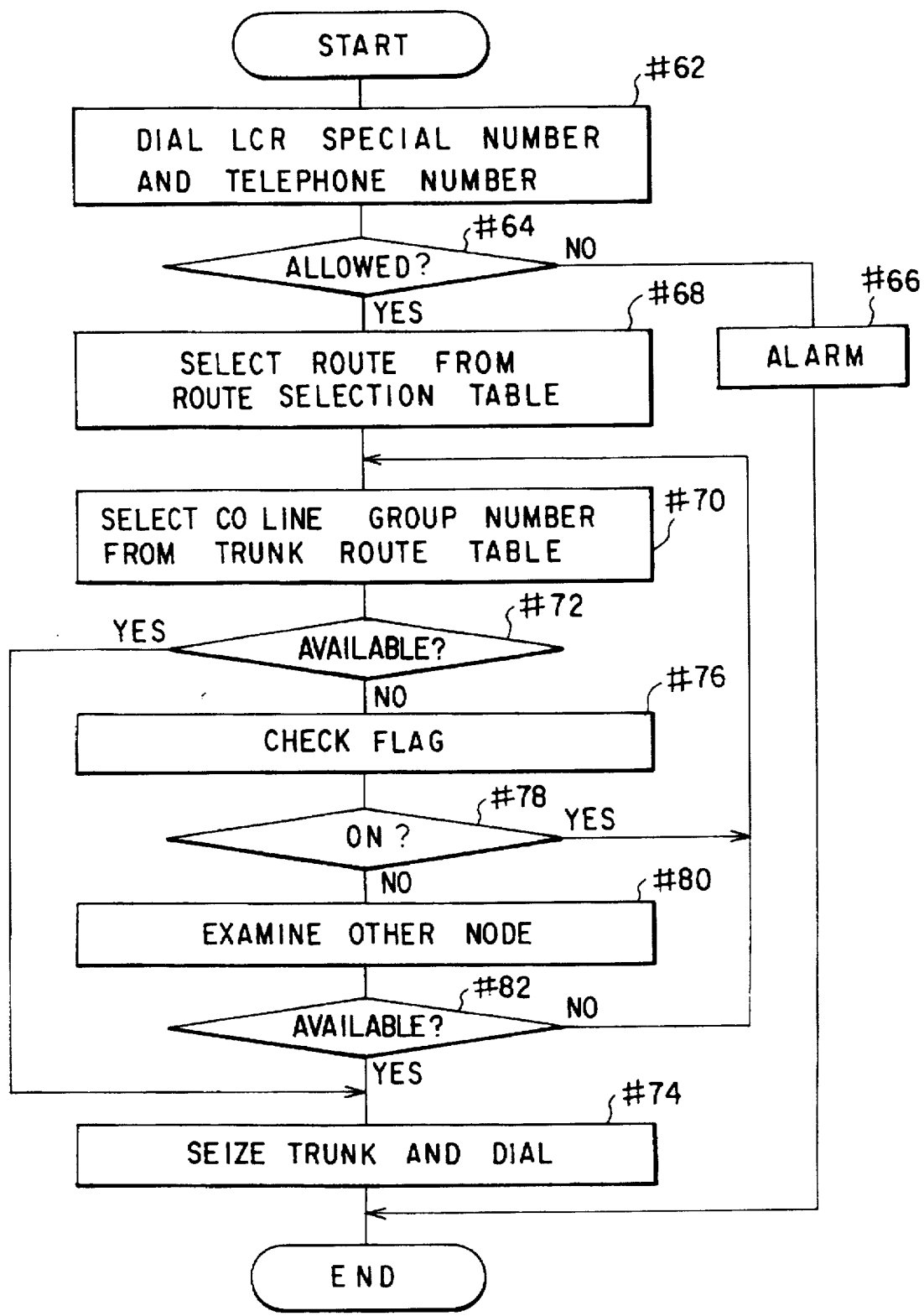
FIG. 14 is a flowchart for illustrating the route selection operation of the third embodiment.

FIG. 14 is a flowchart for illustrating the operation of the third embodiment. In step #62, a central office line call originating special number and a called subscriber's number, or a least cost routing function special number and a called subscriber's number (in either case, the called subscriber's number includes a toll call number) are dialed from an extension telephone accommodated in the PBX. In step #64, the control unit 21 in the PBX in which the call originating extension telephone is accommodated checks the calling restriction and destination restriction to check whether the communication is permitted or not. If the communication is not permitted, an alarm sound is generated in step #66 to inform the operator of the extension line that the originating call cannot be generated from the extension line.

On the other hand, if the communication is permitted, the control unit 21 derives a route from the route selection table (shown in FIG. 8, for example) based on a destination area (information indicating a toll call area of the call destination, and in this case, toll number) based on the dial number and a call originating day of the week, a call originating time and a class of the extension line based on the clock function and calendar function of the control unit 21 of the PBX in step #68.

Next, in step #70, one of the central office line groups to be used is selected from the trunk route table (FIG. 12) for the route. The available/busy state of the central office line groups to be used in the self node is checked by referring to the accommodated central office line trunk state information storing table (FIG. 13) storing available/busy information of the central office lines in step #72. The available/busy state of the central office line groups is updated by the PBX and the newest information can be detected in the self node.

If it is detected that there is an available central office line after the available/busy state of the central office line groups to be used is checked, a central office line is seized in step #74 and dial number is transmitted. The control unit 21 seizes an available one of the central office line trunks connected to the central office line group in the self node, changes a to-be-converted digit of dial number from the calling extension telephone according to the table of FIG. 12 and transmits the converted information to the seized central office line trunk. Then, a circuit on the network side is obtained, and when the destination terminal responds, a communication path is obtained in the self node, thereby permitting the communication.

On the other hand, if it is detected in step #72 that there in no available central office line group, the state of the flag of the central office line group number in the trunk route table (FIG. 12) is checked in step #76. If the flag is set in the ON state, the process is returned to step #70, and a next central office line group number is read out from the trunk route table and the above process is repeatedly effected. If the flag is set in the OFF state, another node having the to-be-used central office line group is searched in step #80. Whether a searched corresponding central office line group is available or not is checked in step #82, and if it is available, a central office line is seized in step #74 and dial number is transmitted. The control unit 21 in the self node effects the preset control in order to provide a bypass route for the route of the call originating extension telephone by use of the other node in which the available central office line group is detected, acquires a central office line trunk connected to an available central office line of the to-be-used central office line group, receives dial number (obtained by changing a to-be-converted digit of the dial number from the calling extension based on the table of FIG. 12) subjected to the necessary change from the PBX accommodating the call originating extension telephone and transmits the same to the seized central office line trunk. Then, a circuit on the network side is seized, and if the destination terminal responds, the call originating extension telephone permits the communication by use of a communication path obtained via the self node, station, optical loop and the other node.

If it is detected in step #82 that no available central office line group is present in the other node, the process is returned to step #70.

It is assumed that the control unit of the PBX accommodating the extension line of call originating source functions such that, when an available circuit of another node is used (when a bypass route is provided by using the other node), a route of the highest order is used as the least cost route, and if it cannot be used, the second best least cost route is used.

Thus, the third embodiment is an exchange system having a plurality of PBXs which include central processing units for effecting the calling control operations, which can accommodate a plurality of extensions and a plurality of central office lines, and which are connected to one another via a high-speed communication path, and when an originating call is made from the extension line to the central office line and if all of the self-node accommodated central office lines of a type corresponding to the type of the circuit used for call originating are busy, another node accommodated central office line of the same type as the type of the circuit is used if it is available, and at the same time, when an originating call is made from the extension line accommodated in any one of the PBXs to the central office line, a central office line group capable of making an originating call via the least cost route which can be used at this time and a central office line used for application of the least cost route obtained by referring to the table (LCR route table) which makes it possible to derive information converted into required dial number to be transmitted to the network to obtain the available least cost route in the priority order are sequentially obtained in the priority order thereof based on at least the called area, call originating time zone, and call originating day information (day factor of day of the week, or week day/holiday), if the central office line is obtained, the dial number of the call originating extension line is converted as required so as to derive dial number of the least cost route transmitted from the thus obtained central office line to the network and then transmitted to the network, and when a central office line used for application of the least cost route is busy, a central office line of another node is obtained for use, dial number necessary for application of the least cost route is transmitted by use of the central office line so as to connect the call originating extension line to the call incoming side via the least cost route, when an available central office line used for application of the least cost route is not present in the exchange accommodating the call originating extension line to the central office line, an available central office line of the self node used for application of the least cost route which has the second best priority order is used according to the setting, and when neither of the above central office lines can be used, a central office line of another node is used.

Therefore, in a case where the least cost route is used, the control operation is effected to use a central office line used for application of the second best least cost route according to the setting if an available central office line used for application of the least cost route which makes a connection with a destination to be communicated with the call originating extension line is not present in the exchange accommodating the extension line which has generated an originating call to the central office line, and use a central office line of the other node only when neither of the above central office lines are available, and thus, the rate of occurrence of communication between the PBXs is reduced so that an originating call can be smoothly transmitted to the central office line and a connection for the inter-extension communication can be smoothly attained, thereby giving no influence on the system operation.

As described above, according to the present invention, a PBX which can make a flexible route selection according to the requirement of the user can be provided. Further, according to the present invention, a PBX which has an LCR function to sufficiently provide a communication cost reducing effect can be provided. Further, according to the present invention, there is provided a PBX system which is an exchange system which has a plurality of PBXs connected to one another and in which when an available central office line of a type to be used is not present in an exchange, an available central office line of a corresponding type in another exchange can be used, and which can suppress occurrence of a state in which the telephone call including the extension communication is made difficult because the number of telephone calls to the central office line of another exchange becomes larger to increase the traffic amount in the communication path between the extensions line, thereby making it possible to enhance the user service.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the table used in the first or second embodiment can be adequately used as the route selection table used in the third embodiment.

What is claimed is:

1. A private branch exchange apparatus connected between a communication originating terminal and a destination via a plurality of routes, comprising:

means for storing desired usage rates preset for each of the plurality of routes;

means for varying the desired usage rates;

means for calculating actual usage rates of each of the plurality of routes;

means for preselecting available routes among the plurality of routes according to the destination; and means for selecting one of said available routes whose actual usage rate is most different from the desired usage rate.

2. An apparatus according to claim 1, in which said usage rate calculating means comprises means for calculating the actual usage rate based on the number of times a respective route is selected.

3. An apparatus according to claim 1, in which said usage rate calculating means comprises means for calculating the actual usage rate based on the length of time a respective route is used.

4. An apparatus according to claim 1, in which said preselecting means comprises:

means for storing cost indices; and means for determining routes whose cost indices lie in a preset permissive range from an optimum value as the available routes.

5. An apparatus according to claim 1, in which said preselecting means comprises:

means for storing cost indices for the respective routes in accordance with communication days of the week; and means for determining routes whose cost indices lie in a preset permissive range from an optimum value as the available routes.

6. An apparatus according to claim 1, in which said preselecting means comprises:

means for storing cost indices for the respective routes in accordance with a communication day of the week and communication time zone; and means for determining routes whose cost indices lie in a preset permissive range from an optimum value as the available routes.

7. An apparatus according to claim 1, in which said preselecting means comprises:

means for storing cost indices for the respective routes in accordance with a communication day of the week, a communication time zone and a class of the communication originating terminal; and means for determining routes whose cost indices lie in a preset permissive range from an optimum value as the available routes.

8. An apparatus according to claim 1, in which said preselecting means comprises:

means for storing cost indices for the respective routes in accordance with a communication day of the week, a communication time zone, a class of the communication originating terminal, and an average communication time of the communication originating terminal; and means for determining routes whose cost indices lie in a preset permissive range from an optimum value as the available routes.

9. An apparatus according to claim 1, in which said preselecting means comprises:

means for storing cost indices for the respective routes in accordance with a communication day of the week, a communication time zone, a class of the communication originating terminal, and an average communication time of the communication originating terminal; and means for determining routes whose cost indices lie in a preset permissive range from an optimum value as the available routes.

10. A private branch exchange apparatus connected between a communication originating terminal and destinations via a plurality of routes, comprising:

means for calculating estimated communication times for the respective destinations;

means for storing cost indices for the respective routes in accordance with the destinations and estimated communication times; and means for selecting an optimum route according to the cost indices stored in said storing means.

11. An apparatus according to claim 10, in which said optimum route selecting means comprises:

means for reselecting available routes whose cost indices lie in a preset permissive range from an optimum value; and means for determining one of said available routes whose usage rate is most different from a corresponding one of desired usage rates previously set for the respective routes as the optimum route.

12. An apparatus according to claim 11, in which said determining means comprises means for calculating the usage rate based on the number of times by which the route is selected.

13. An apparatus according to claim 11, in which said determining means comprises means for calculating the usage rate based on the length of time during which the route is used.

14. An apparatus according to claim 11, in which said preselecting means comprises:

means for storing cost indices for the respective routes in accordance with a communication day of the week; and means for determining routes whose cost indices lie in a preset permissive range from an optimum value as the available routes.

15. An apparatus according to claim 11, in which said preselecting means comprises:
   means for storing cost indices for the respective routes in accordance with a communication day of the week and a communication time zone; and
   means for determining routes whose cost indices lie in a preset permissive range from an optimum value as the available routes.

16. An apparatus according to claim 11, in which said preselecting means comprises:
   means for storing cost indices for the respective routes in accordance with a communication day of the week, a communication time zone, and a class of the communication originating terminal; and
   means for determining routes whose cost indices lie in a preset permissive range from an optimum value as the available routes.

17. An apparatus according to claim 11, in which said preselecting means comprises:
   means for storing cost indices for the respective routes in accordance with a communication day of the week, a communication time zone, a class of the communication originating terminal, and an average communication time of the communication originating terminal; and
   means for determining routes whose cost indices lie in a preset permissive range from an optimum value as the available routes.

18. An apparatus according to claim 11, in which said preselecting means comprises:
   means for storing cost indices for the respective routes in accordance with a communication day of the week, a communication time zone, a class of the communication originating terminal, and an average communication time of the communication originating terminal; and
   means for determining routes whose cost indices lie in a preset permissive range from an optimum value as the available routes.

19. An exchange system which is constructed by connecting plural private branch exchanges which each have plural central office line groups having the same function and each connected to destinations via plural routes, the system comprising:
   means for selecting an optimum route at the time of call originating from an extension line which is connected to exchange and a central office line group which can use the optimum route including
   means for determining usage rates of the respective routes including
      means for determining the usage rate based on the number of times by which the route is selected,
   means for determining available routes according to the destination, and
   means for selecting one of said available routes whose usage rates is most different from a corresponding one of desired usage rates previously set for the respective routes;
   means for determining whether the central office line group which can use the optimum route is available or not;
   means for effecting the call originating operation via the optimum route by using another central office line group having the same function when the above-mentioned selected central office line group is busy; and
   means for effecting the call originating operation via the optimum route by using a central office line group corresponding to the selected central office line group and provided in another exchange when all of the central office line groups having the same function as the selected central office line group and provided in said given exchange are busy.

20. An exchange system which is constructed by connecting plural private branch exchanges which each have plural central office line groups having the same function and each connected to destinations via plural routes, the system comprising:
   means for selecting an optimum route at the time of call originating from an extension line which is connected to a given exchange and a central office line group which can use the optimum route including
      means for determining usage rates of the respective routes including
         means for determining the usage rate based on the length of time during which the route is used,
      means for determining available routes according to the destination, and
      means for selecting one of said available routes whose usage rates is most different from a corresponding one of desired usage rates previously set for the respective routes;
   means for determining whether the central office line group which can use the optimum route is available or not;
   means for effecting the call originating operation via the optimum route by using another central office line group having the same function when the above-mentioned selected central office line group is busy; and
   means for effecting the call originating operation via the optimum route by using a central office line group corresponding to the selected central office line group and provided in another exchange when all of the central office line groups having the same function as the selected central office line group and provided in said given exchange are busy.

21. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:
   means for selecting an optimum route at the time of call originating from an extension line which is connected to a given exchange and the priority central office line group which can use the optimum route, the selecting means including
      means for calculating actual usage rates of the respective routes,
      means for preselecting available routes according to the destination, the preselecting means including
         means for storing cost indices for the respective routes in accordance with a communication day of the week, and
         means for determining routes whose cost indices lie in a preset permissive range from an optimum value as the available routes, and
      means for selecting one of said available routes whose actual usage rate is most different from a corresponding one of desired usage rates previously set for the respective routes;

means for determining whether the priority central office line groups that can use the optimum route are available;

means for effecting the call originating operation via the optimum route by Using a central office line group other than the priority central office line groups having the equivalent function of the priority central office line groups when the selected priority central office line group is busy; and means for effecting the call originating operation via the optimum route by using a central office line group corresponding to the selected priority central office line group provided in another exchange when all of the priority central office line groups and central office line groups having the equivalent function as the selected priority central office line group provided in said given exchange are busy.

22. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:

means for selecting an optimum route at the time of call originating from an extension line which is connected to a given exchange and the priority central office line group which can use the optimum route, the selecting means including means for calculating actual usage rates of the respective routes, means for preselecting available routes according to the destination, the preselecting means including means for storing cost indices for the respective routes in accordance with a communication day of the week and a communication time zone, and means for determining routes whose cost indices lie in a preset permissive range from an optimum value as the available routes, and means for selecting one of said available routes whose actual usage rate is most different from a corresponding one of desired usage rates previously set for the respective routes;

means for determining whether the priority central office line groups that can use the optimum route are available;

means for effecting the call originating operation via the optimum route by using a central office line group other than the priority central office line groups having the equivalent function of the priority central office line groups when the selected priority central office line group is busy; and means for effecting the call originating operation via the optimum route by using a central office line group corresponding to the selected priority central office line group provided in another exchange when all of the priority central office line groups and central office line groups having the equivalent function as the selected priority central office line group provided in said given exchange are busy.

23. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:

means for selecting an optimum route at the time of call originating from an extension line which is connected to a given exchange and the priority central office line group which can use the optimum route, the selecting means including means for calculating actual usage rates of the respective routes, means for preselecting available routes according to the destination, the preselecting means including means for storing cost indices for the respective routes in accordance with a communication day of the week, a communication time zone, and a class of communication originating terminal, and means for determining routes whose cost indices lie in a preset permissive range from an optimum value as the available routes, and means for selecting one of said available routes whose actual usage rate is most different from a corresponding one of desired usage rates previously set for the respective routes;

means for determining whether the priority central office line groups that can use the optimum route are available;

means for effecting the call originating operation via the optimum route by using a central office line group other than the priority central office line groups having the equivalent function of the priority central office line groups when the selected priority central office line group is busy; and means for effecting the call originating operation via the optimum route by using a central office line group corresponding to the selected priority central office line group provided in another exchange when all of the priority central office line groups and central office line groups having the equivalent function as the selected priority central office line group provided in said given exchange are busy.

24. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:

means for selecting an optimum route at the time of call originating from an extension line which is connected to a given exchange and the priority central office line group which can use the optimum route, the selecting means including means for calculating actual usage rates of the respective routes, means for preselecting available routes according to the destination, the preselecting means including means for storing cost indices for the respective routes in accordance with a communication day of the week, a communication time zone, a class of communication originating terminal, and an average communication time of the communication originating terminal, and means for determining routes whose cost indices lie in a preset permissive range from an optimum value as the available routes, and means for selecting one of said available routes whose actual usage rate is most different from a corresponding one of desired usage rates previously set for the respective routes;

means for determining whether the priority central office line groups that can use the optimum route are available;

means for effecting the call originating operation via the optimum route by using a central office line group other than the priority central office line groups having the equivalent function of the priority central office line groups when the selected priority central office line group is busy; and means for effecting the call originating operation via the optimum route by using a central office line group corresponding to the selected priority central office line group provided in another exchange when all of the priority central office line groups and central office line groups having the equivalent function as the selected priority central office line group provided in said given exchange are busy.

25. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:

means for selecting an optimum route at the time of call originating from an extension line which is connected to a given exchange and the priority central office line group which can use the optimum route, the selecting means including means for calculating actual usage rates of the respective routes, means for preselecting available routes according to the destination, the preselecting means including means for storing cost indices for the respective routes in accordance with a communication day of the week, a communication time zone, a class of communication originating terminal, and an average communication time of the communication originating terminal for the respective destination, and means for determining routes whose cost indices lie in a preset permissive range from an optimum value as the available routes, and means for selecting one of said available routes whose actual usage rate is most different from a corresponding one of desired usage rates previously set for the respective routes;

means for determining whether the priority central office line groups that can use the optimum route are available;

means for effecting the call originating operation via the optimum route by using a central office line group other than the priority central office line groups having the equivalent function of the priority central office line groups when the selected priority central office line group is busy; and means for effecting the call originating operation via the optimum route by using a central office line group corresponding to the selected priority central office line group provided in another exchange when all of the priority central office line groups and central office line groups having the equivalent function as the selected priority central office line group provided in said given exchange are busy.

26. An exchange system which is constructed by connecting a plurality of private branch exchanges, wherein each private branch exchange has a plurality of priority central office line groups and a plurality of central office line groups having an equivalent function and each connected to destinations via a plurality of routes, the system comprising:

means for selecting an optimum route at the time of call originating from an extension line which is connected to a given exchange and the priority central office line group which can use the optimum route, the selecting means including means for calculating average communication times for the respective destinations for each communication originating terminal, means for storing cost indices for the respective routes in accordance with an average communication time, and means for determining an optimum route according to the destination and the average communication time of the communication originating terminal;

means for determining whether the priority central office line groups that can use the optimum route are available;

means for effecting the call originating operation via the optimum route by using a central office line group other than the priority central office line groups having the equivalent function of the priority central office line groups when the selected priority central office line group is busy; and means for effecting the call originating operation via the optimum route by Using a central office line group corresponding to the selected priority central office line group provided in another exchange when all of the priority central office line groups and central office line groups having the equivalent function as the selected priority central office line group provided in said given exchange are busy.

27. A system according to claim 26, in which said optimum route determining means comprises:

means for storing cost indices for the respective routes;

means for determining routes whose cost indices lie in a preset permissive range from an optimum value as available routes; and means for selecting one of said available routes whose usage rate is most different from a corresponding one of desired usage rates previously set for the respective routes.

28. A system according to claim 26, in which said determining means comprises means for calculating the usage rate based on the number of times by which the route is selected.

29. A system according to claim 26, in which said determining means comprises means for calculating the usage rate based on the length of time during which the route is used.

* * * * *

UNITED STATES PATENT AND TRADEMARK OFFICE
CERTIFICATE OF CORRECTION

PATENT NO.   : 5,715,304
DATED        : February 3, 1998
INVENTOR(S)  : Toshio Nishida et al.

It is certified that error appears in the above-indentified patent and that said Letters Patent is hereby corrected as shown below:

Claim 6, Col. 21, line 66, after "and", insert --a--.

Claim 11, Col. 22, line 49, "reselecting" should read --preselected--.

Claim 19, Col. 23, line 50, before "exchange", insert --a given--.

Claim 21, Col. 25, line 7, "Using" should read --using--.

Claim 26, Col. 28, line 33, "Using" should read --using--.

Signed and Sealed this

Twenty-seventh Day of July, 1999

Attest:

Q. TODD DICKINSON

*Attesting Officer*        *Acting Commissioner of Patents and Trademarks*